United States Patent Office 2,976,080
Patented Mar. 21, 1961

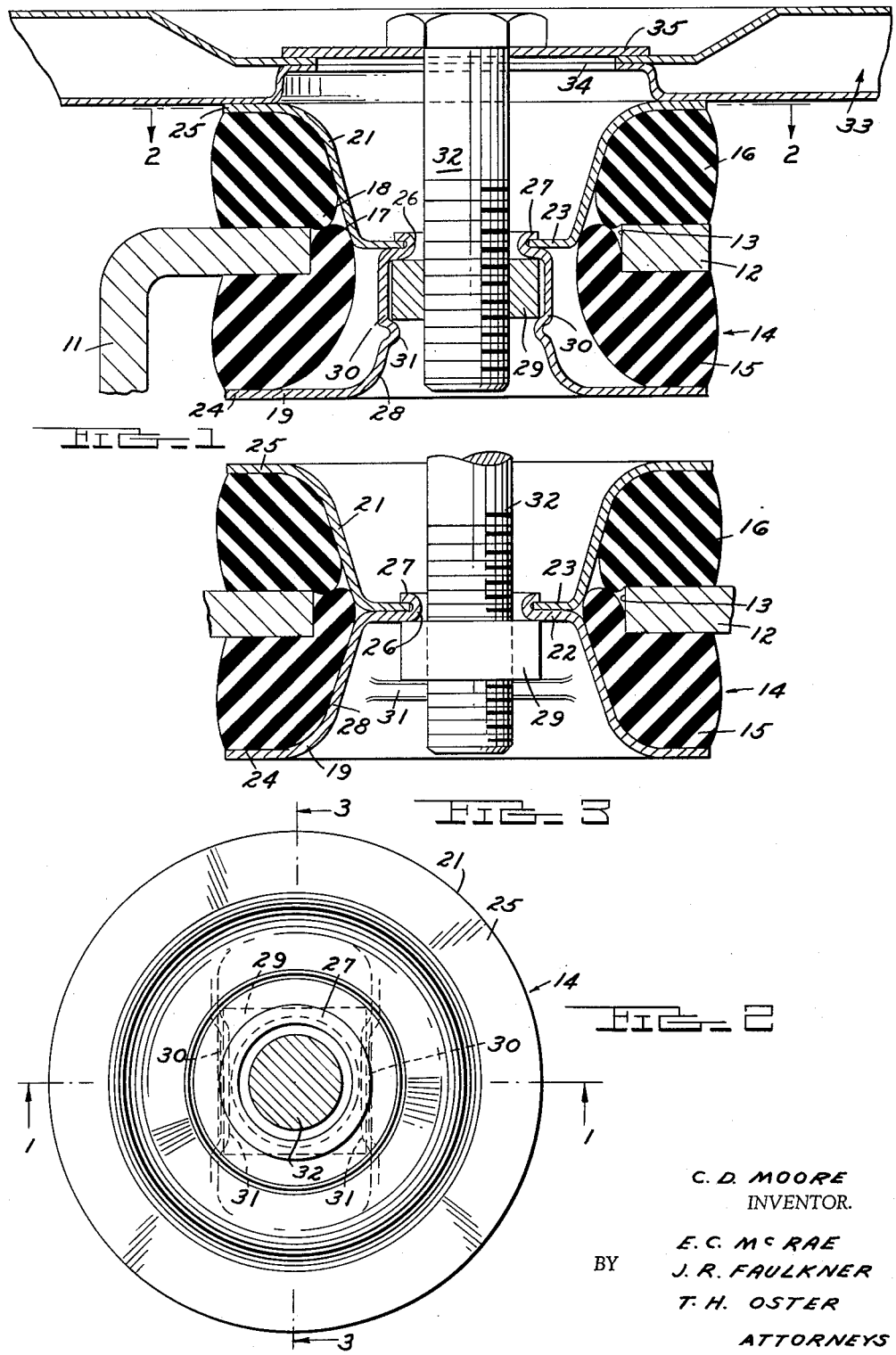

2,976,080

MOTOR VEHICLE BODY MOUNTS

Charles D. Moore, Birmingham, Mich., assignor to Ford Motor Company, Dearborn, Mich., a corporation of Delaware Filed Jan. 29, 1958, Ser. No. 711,955

2 Claims. (Cl. 296—35)

This invention relates generally to resilient mounts for attaching a motor vehicle body to a motor vehicle frame.

It is customary to attach a motor vehicle body to the motor vehicle frame by means of a plurality of spaced body mounts incorporating resilient insulators adapted to insulate the body against frame vibrations and noise. In a co-pending application of A. L. Schaldenbrand, Ser. No. 509,815, filed May 20, 1955, now Patent No. 2,838,339, issued June 10, 1958, there are disclosed body mounts which are adapted to be pre-assembled or pre-mounted on the vehicle frame. With pre-mounted body mounts it is only necessary for the assemblers in assembling the body to the frame to make a simple insertion of the fastening means to each body mount. Problems relative to the handling of a plurality of mounting device parts on the body assembly line and problems of proper positioning and alignment of the parts are substantially eliminated.

It is an object of the present invention to provide a further and improved embodiment of body mounts of the type disclosed in the above identified co-pending application. The improved embodiment of the body mounts are characterized by a reduction in the number of parts comprising the mount, by simplification of fabrication and by simplification of the method of attachment to the vehicle frame.

Basically, the body mounts embodying the present invention comprise a pair of resilient insulators formed with a large central aperture and adapted to be positioned on opposite sides of a frame outrigger bracket. The insulators are retained on the bracket members by retaining members which in general comprise peripherally flanged cup-shaped members. The retaining members are positioned in inverted relationship to each other with their respective centrally apertured cup portions abutting each other and suitably secured by fastening means. Suitable cage means is provided to non-rotatably retain a nut means adapted to receive the body hold down bolt used to connect the body to each of the body mounts carried by the frame.

In the embodiment of the present invention disclosed herein the means securing the two retaining members to each other comprises an annular flange portion around the central aperture of the one member which is inserted through the central aperture of the other member, the flange portion then being flared or turned down to prevent separation of the members. The cage means for non-rotatably retaining the nut means is obtained by suitably deforming the side wall of the cup-shaped portion of the retaining member which is to be the lower member when positioned on the outrigger bracket. The deformation is such that at least two diametrically opposite flat surfaces are provided which are adapted to abut correspondingly positioned flat surfaces on the nut means. The fit of the nut means between the cup portion flat surfaces is such that the nut, while being loosely held, cannot turn when the body hold down bolt means is threaded therethrough. A suitable retaining rib is embossed beneath each side flat surface to prevent the nut means from falling out of the retainer before the insertion of the bolt means.

Other objects, advantages and features of this invention will be made more apparent as this description proceeds, particularly when considered in connection with the accompanying drawings, wherein:

Fig. 1 is a sectional view taken substantially through line 1—1 of Fig. 2 looking in the direction of the arrows illustrating the body mount incorporating the present invention as assembled to a frame part and body part.

Fig. 2 is a sectional view taken substantially through line 2—2 of Fig. 1 looking in the direction of the arrows.

Fig. 3 is a sectional view taken substantially through line 3—3 of Fig. 2 looking in the direction of the arrows.

Referring now to the drawings, and particularly to the embodiment of the invention as illustrated in Figs. 1 to 3, inclusive, there is illustrated the fragmentary end portion 11 of a motor vehicle frame outrigger bracket carried by and extending laterally outwardly from a vehicle frame (not shown) in a conventional manner. The outrigger bracket 11 is provided with a horizontal flange 12 formed with an aperture 13 therein. The body mounting device, generally designated 14, comprises a pair of centrally apertured resilient insulators 15 and 16, respectively. The insulators are molded of a suitable grade of rubber and are initially of generally cylindrical form in their free shape, but as will be noted they are compressed and distorted when assembled to the frame bracket.

The lower insulator 15 is provided with a centrally located annular or ring portion 17 projecting upwardly from its upper surface. This annular or ring portion is adapted to fit within the bracket aperture 13 thereby to act as an insulating spacer means for the body mount. The upper insulator 16 is provided with a much smaller depending annular or ring portion 18. As shown, see Figs. 1 and 3, the annular or ring portion 18 projects into the aperture 13 slightly in abutting relation to the upper surface of the annular or ring portion 17. The annular or ring portion 18 functions primarily as a centering or locating means to ensure proper positioning of the insulator 16 during assembly of the parts of the body mount on the bracket flange 12.

The insulators 15 and 16 are held on the bracket flange 12 by means of a pair of centrally apertured retaining members 19 and 21. The retaining members 19 and 21 are generally cup-shaped and extend into the apertures in the rubber insulators 15 and 16, respectively. The retaining members are positioned in inverted relation to each other, that is, with their respective base portions 22 and 23 abutting each other. Each of the cup-shaped retaining members is formed with a peripheral flange 24 and 25, respectively, engaging the outer sides of the respective insulators 15 and 16 to enable them to be compressed and clamped to the flange 12 of the outrigger bracket.

It will be noted that the base portion 22 on the retaining member 19 is provided with an annular flange 26 at the periphery of its central aperture. The outer diameter of the flanges 26 is such that it will, before assembly, fit through the central aperture in the base portion 23 on the upper insulator retaining member 21. After the insertion of the flange 26 through the central aperture of the upper retaining member base portion 23, the protruding portion of the flange is flared or turned outwardly forming a retaining lip 27 securely fastening the two retainer members 19 and 21 together. It is during the process of securing the two retainer members together that the insulators 15 and 16 are compressed and caused to assume the shape shown in Figs. 1 and 3.

It will be noted that the lower retaining member 19 cup portion 28 is contoured to form a nut retaining cage means. This is accomplished by positioning the nut 29 within the cup portion 28 and then compressing or deforming the side wall of the cup to form two diametrically opposed flat portions 30 embracing opposite sides of the nut 29. Immediately below the flat surfaces 30 the cup wall is embossed to provide opposed ribs 31 immediately underlying the lateral edges of the nut and effectively retaining the same within the cup of the retaining member. The nut is preferably loosely held to permit it to be shifted slightly for alignment with the bolt 32 to be used to secure the body to the frame. However, the relationship of the flat sides of the bolt to the flat cup wall surfaces 30 is such that the nut is effectively held against rotation as the bolt 32 is threaded therethrough.

It will be understood that the bolt is caged within the cup portion 28 of the lower retainer member 21 prior to the assembly of the body mounting device 14 on the bracket flange 12.

During the manufacture of the vehicle, a body mount 14 is assembled upon each of the frame outrigger brackets 11 prior to the dropping of the vehicle body upon the frame. The vehicle body is dropped on the frame with the underbody assembly 33 positioned so that the openings 34 therein are in substantial axial alignment with the body mounts 14. A suitable lock washer 35 is positioned over the body opening 34 and the body hold down bolt 32 is inserted therethrough and threadably engaged with the nut 29. Suitable tightening of the bolt completes the assembly of the underbody to the mount.

The opening 34 in the underbody assembly is sufficiently large to accommodate slight misalignments between the various body mounts and the body. It will be readily apparent that with the mounts pre-assembled to the frame outrigger brackets the final assembly of the body to the frame is greatly simplified.

It will be understood that the invention is not to be limited to the exact construction shown and described, but that various changes and modifications may be made without departing from the spirit and scope of the invention, as defined in the appended claims.

What is claimed is:

1. A body mount for connecting a motor vehicle body part to an apertured motor vehicle frame part, comprising a pair of apertured resilient insulators positioned on opposite sides of said frame part, a pair of cup-shaped retaining members having flange portions and base portions, said retaining members being oppositely disposed with respect to each other and extending into the apertures in said insulators, said retaining member flange portions overlying the respective outer sides of said insulators and the base portions abutting each other, said base portions being centrally apertured, a nut means, cage means integrally formed in the cup wall of one of said retaining members, said cage means comprising deformations in said cup wall forming diametrically opposed flat portions contiguous to opposite sides of said nut means to retain the latter against turning movement and in substantial alignment with said apertures, said cup wall being provided with inwardly projecting ribs below said flat portions to retain said nut means against axial displacement, and bolt means engageable with said nut means and securing said body part to said frame part through said body mount.

2. A body mount for connecting a motor vehicle body part to an apertured motor vehicle frame part, comprising a pair of apertured resilient insulators positioned on opposite sides of said frame part, a pair of cup-shaped retaining members having flange portions and base portions, said retaining members being oppositely disposed with respect to each other and extending into the apertures in said insulators, said retaining member flange portions overlying the respective outer sides of said insulators and the base portions abutting each other, said base portions being centrally apertured, one of said base portions having an integral portion thereof projecting through and overlapping the peripheral edge of the central aperture in the other base portion to hold said base portions in said abutting relation and said insulators under compression thereby clamping the latter to said frame part to form an assembly thereon, a nut means, cage means integrally formed in the cup wall of one of said retaining members, said cage means comprising deformations in said cup wall forming diametrically opposed flat portions contiguous to opposite sides of said nut means to retain the latter against turning movement and in substantial alignment with said apertures, said cup wall being provided with inwardly projecting ribs below said flat portions to retain said nut means against axial displacement, and bolt means engageable with said nut means and securing said body part to said frame part through said body mount.

References Cited in the file of this patent

UNITED STATES PATENTS

| | | |
|---|---|---|
| 1,823,429 | Jansson | Sept. 15, 1931 |
| 1,871,963 | Dill | Aug. 16, 1932 |
| 2,099,655 | MacFadden | Nov. 16, 1937 |
| 2,132,840 | Workman et al. | Oct. 11, 1938 |
| 2,838,339 | Schaldenbrand | June 10, 1958 |
| 2,883,232 | Olley | Apr. 21, 1959 |

FOREIGN PATENTS

| | | |
|---|---|---|
| 504,865 | Canada | Aug. 3, 1954 |
| 930,359 | France | Aug. 4, 1947 |